United States Patent
Zhang et al.

(10) Patent No.: US 9,374,810 B2
(45) Date of Patent: Jun. 21, 2016

(54) SCHEDULING OF DOWNLINK DATA RESOURCES

(75) Inventors: Li Zhang, Beijing (CN); Peter Skov, Beijing (CN); Jie Zhen Lin, Beijing (CN); Chunli Wu, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 311 days.

(21) Appl. No.: 14/122,371

(22) PCT Filed: Jun. 3, 2011

(86) PCT No.: PCT/CN2011/075283
§ 371 (c)(1),
(2), (4) Date: Nov. 26, 2013

(87) PCT Pub. No.: WO2012/162898
PCT Pub. Date: Dec. 6, 2012

(65) Prior Publication Data
US 2014/0119348 A1 May 1, 2014

(51) Int. Cl.
*H04W 72/04* (2009.01)
*H04W 72/12* (2009.01)

(52) U.S. Cl.
CPC ........ *H04W 72/042* (2013.01); *H04W 72/1289* (2013.01)

(58) Field of Classification Search
None
See application file for complete search history.

(56) References Cited

U.S. PATENT DOCUMENTS

| | | | |
|---|---|---|---|
| 2008/0025236 A1* | 1/2008 | Jones | 370/280 |
| 2009/0185632 A1* | 7/2009 | Cai et al. | 375/260 |
| 2010/0080137 A1* | 4/2010 | Vedantham et al. | 370/252 |
| 2010/0309867 A1 | 12/2010 | Palanki et al. | 370/329 |
| 2011/0243085 A1* | 10/2011 | Seo et al. | 370/329 |
| 2011/0312328 A1* | 12/2011 | Choi et al. | 455/450 |
| 2012/0033624 A1* | 2/2012 | Luo et al. | 370/329 |
| 2012/0307744 A1* | 12/2012 | Charbit et al. | 370/329 |
| 2013/0136006 A1* | 5/2013 | Kim et al. | 370/241 |
| 2014/0098774 A1* | 4/2014 | Gao et al. | 370/329 |

FOREIGN PATENT DOCUMENTS

| | | |
|---|---|---|
| CN | 101272525 A | 9/2008 |
| CN | 101378286 A | 3/2009 |
| WO | WO2011/021827 A2 | 2/2011 |

OTHER PUBLICATIONS

3GPP TS 36.300 V10.3.0 (Mar. 2011); "3rd Generation Partnership Project; Technical Specification Group Radio Access Network; Evolved Universal Terrestrial Radio Access (E-UTRA) and Evolved Universal Terrestrial Radio Access Network (E-UTRA); Overall description; Stage 2 (Release 10)"; 197 pgs.

(Continued)

*Primary Examiner* — Steven H Nguyen
(74) *Attorney, Agent, or Firm* — Harrington & Smith (57) ABSTRACT

There is provided a control entity for a communication network, a base station including such a control entity and a user equipment for communication with such a base station. The control entity includes a controller for providing a downlink control signal (e.g. a downlink assignment) scheduling a downlink data resource in a first time slot wherein the controller is configured for providing the downlink control signal over a downlink control resource in an earlier time slot which is chronologically earlier than the first time slot.

18 Claims, 2 Drawing Sheets

(56) References Cited

OTHER PUBLICATIONS

3GPP TS 36.213 V9.1.0 (Mar. 2010); "3rd Generation Partnership Project; Technical Specification Group Radio Access Network; Evolved Universal Terrestrial Radio Access (E-UTRA); Physical layer procedures (Release 9)"; 79 pgs.

Parkvall S., et al.; "Next generation LTE, LTE-Advanced", Dec. 21, 2010, pp. 22-28, XP055145629, (7 pages).

* cited by examiner

SCHEDULING OF DOWNLINK DATA RESOURCES

FIELD OF INVENTION

The present invention relates to the field of communication networks, e.g. cellular communication networks.

ART BACKGROUND

In current communication networks, it is known to schedule downlink data resources in specific time slots. It is known to provide time division duplexing (TDD) separating uplink and downlink resources on the same carrier by time division multiplexing. Further it is known to provide frequency division duplexing (FDD), i.e. to provide uplink and downlink resources on different carriers.

In current specifications [3GPP TS 36.213, v.9.1.0, Section 7.1] for both FDD and TDD, the scheduling of DL data resource is always performed in the same time slot when the DL data is transmitted, as it is straightforward that when there is DL data resource, there should also exist DL control resource. However, this may not be true in future releases, e.g. for cross-carrier scheduling in carrier aggregation systems (3GPP TS 36.300, v.10.3.0).

SUMMARY OF THE INVENTION

In view of the above-described situation, there exists a need for an improved technique that enables to improve the characteristics of the communication system.

This need may be met by the subject matter according to the independent claims. Advantageous embodiments of the present invention are described by the dependent claims.

According to a first aspect of the herein disclosed subject-matter, there is provided a control entity for a communication network, the control entity comprising: a controller for generating a downlink control signal scheduling a downlink data resource in a first time slot; wherein the controller is configured for providing the downlink control signal over a downlink control resource in an earlier time slot which is chronologically earlier than the first time slot.

This aspect of the herein disclosed subject-matter is based on the idea that the usage of downlink data resources can be improved by scheduling a downlink data resource in a first time slot by usage of an earlier time slot which is chronologically earlier than the first time slot.

According to an embodiment, the downlink data resource is physical downlink shared channel, e.g. as defined in third generation partnership project (3GPP) long term evolution (LTE), e.g. in release 9, 10, or 11. According to a further embodiment, the downlink control resource is a physical downlink control channel, e.g. as defined in 3GPP LTE, e.g. in release 9, 10, or 11. According to a further embodiment, the downlink control signal is a downlink assignment. According to a further embodiment, the downlink control signal includes a downlink assignment. According to an embodiment, a downlink assignment indicates a transmission on the downlink data resource to a user equipment.

Further, the term "chronologically earlier" is generally to be understood in the sense of "prior to". In other words, in accordance with embodiments of the herein disclosed subject-matter, a downlink control signal is provided over a downlink control resource in an earlier time slot, wherein the downlink control signal schedules a downlink data resource in a first time slot, wherein the first time slot is chronologically after the earlier time slot.

According to an embodiment, the earlier time slot is used for scheduling a single time slot for a downlink data resource. In another embodiment, the earlier time slot is used for scheduling two or more different first time slots for downlink data resource.

Further, a single downlink assignment may be used for scheduling two or more different first time slots. In another embodiment, multiple assignments are used for scheduling the two or more different first time slots.

According to an embodiment, the term "scheduling a first time slot" stands for "scheduling a downlink data resource in a first time slot".

According to an embodiment, the downlink control signal comprises a downlink index indicating the time slot in which the downlink data resource is to be scheduled. For example, when considering a specific time interval, which might be referred to as a frame, the frame may consist of a number of subframes, wherein each subframe corresponds to a time slot in the sense of the herein disclosed subject-matter. Hence, in an embodiment the downlink index may indicate which subframes of a frame are to be scheduled. According to a further exemplary embodiment, the "time slot" is a subframe as defined in 3GPP LTE, e.g. in release 9, 10, or 11.

According to an embodiment, the controller of the control entity is adapted for mapping a respective state of the downlink index to the first time slot. Generally, according to an embodiment, each state of the downlink index corresponds to and can be mapped on a specific combination of time slots which are to be scheduled. Again, as mentioned above, the mapping may be such that each state corresponds to a single time slot or, in another embodiment, at least one state of the downlink index corresponds to and can be mapped on two or more time slots.

According to an embodiment, the mapping from each state of the DL index to a specific combination of time slots is hard-coded in the specification or is, in another embodiment, semi-statically configured by higher layer signaling.

According to an embodiment, the downlink index is a bit field having a predetermined number of bits, wherein each state of the downlink index corresponds to a specific bit sequence.

Since the earlier time slot is chronologically earlier than the first time slot, the downlink data resource can be scheduled even if the control entity is not available during the first time slot. For example, in case the downlink control resource is provided by a first base station and the downlink data resource is provided by a second base station, scheduling of the downlink data resource in the first time slot is possible, even if the first base station is not available in the first time slot. Accordingly, in a further embodiment, the downlink control resource is provided by a first base station and the downlink data resource is provided by a second base station, different from the first base station. Hence, in such an embodiment the control entity may be configured for scheduling the resources of two or more base stations.

According to a further embodiment, the downlink control resource is located on a first carrier and the downlink data resource is located on the same first carrier.

According to a further embodiment, the downlink control resource is located on a first carrier and the downlink data resource is located on a second carrier, the second carrier being different from the first carrier. For example, according to an embodiment, carriers with carrier-specific TDD configurations and cross-carrier scheduling may be configured to a user equipment. In such a case, embodiments of the herein disclosed subject-matter allow scheduling of a downlink data resource in the first time slot even if there is no corresponding downlink control resource on the first carrier in the first time slot for a respective downlink assignment.

According to a further embodiment, the downlink control resource is located on a first carrier and the downlink data resource is located on the same first carrier and the downlink control resource and the downlink data resource are provided by the same base station. This is possible in future releases, where DL control resource is not available in all of DL subframes, so as to, for example, achieve interference coordination on DL control resources.

It should be understood that generally features of different embodiments can be combined and in particular therefore also the features relating to the carriers and base stations can be combined. Hence, in particular the following embodiments are considered to be disclosed with this application: In an embodiment the downlink control resources and the downlink data resource may be provided on the same carrier but by different base stations. In another embodiment, the downlink control resource and the downlink data resource are provided on the same carrier and are provided by the same base station. According to a further embodiment, the downlink control resource and the downlink data resource are located on different carriers and are provided by different base stations. According to a still further embodiment, the downlink control resource and the downlink data resource are located on different carriers and are provided by the same base station.

According to a second aspect of the herein disclosed subject-matter, a base station for a communication network is provided, the base station comprising a control entity according to the first aspect or an embodiment thereof.

According to an embodiment of the second aspect, the base station is adapted for providing the functionality of one or more of the aforementioned aspects and embodiments and/or for providing the functionality as required by one or more of the aforementioned aspects and embodiments.

According to a third aspect of the herein disclosed subject-matter, a user equipment for a communication network is provided, the user equipment comprising a controller configured for receiving downlink data over a data resource in a first time slot, the first time slot being indicated by a downlink control signal received over a downlink control resource in an earlier time slot which is chronologically earlier than the first time slot.

According to embodiments of the third aspect, the downlink data resource, the downlink control resource, the downlink control signal, the first time slot and/or the earlier time slot may be configured as described with regard to the first aspect or an embodiment thereof.

Further, according to an embodiment of the third aspect, the user equipment is adapted for providing the functionality of one or more of the aforementioned aspects and embodiments and/or for providing the functionality as required by one or more of the aforementioned aspects and embodiments.

According to a fourth aspect of the herein disclosed subject-matter, a communication network is provided, the communication network comprising at least one base station according to the second aspect or an embodiment thereof and at least one user equipment according to the third aspect or an embodiment thereof.

According to an embodiment of the fourth aspect, the communication network is adapted for providing the functionality of one or more of the aforementioned aspects and embodiments and/or for providing the functionality as required by one or more of the aforementioned aspects and embodiments.

According to a fifth aspect of the herein disclosed subject-matter, a method of operating a control entity for a communication network is provided, the method comprising: (i) generating a downlink control signal indicating a first time slot for a downlink data resource; (ii) providing the downlink control signal over a downlink control resource in an earlier time slot which is chronologically earlier than the first time slot.

According to an embodiment of the fifth aspect, the method is adapted for providing the functionality of one or more of the aforementioned aspects and embodiments and/or for providing the functionality as required by one or more of the aforementioned aspects and embodiments.

According to a sixth aspect of the herein disclosed subject-matter, a method of operating a base station of a communication network is provided, the method comprising operating a control entity of the base station according to the method of the fifth aspect or an embodiment thereof.

According to further embodiments of the sixth aspect, the method is adapted for providing the functionality of one or more of the aforementioned aspects and embodiments and/or for providing the functionality as required by one or more of the aforementioned aspects and embodiments.

According to a seventh aspect of the herein disclosed subject-matter, a method of operating a user equipment of a communication network is provided, the method comprising receiving downlink data in a downlink data resource in a first time slot; the first time slot being indicated by a downlink control signal received in an earlier time slot which is chronologically earlier than the first time slot.

According to further embodiments of the seventh aspect, the method is adapted for providing the functionality of one or more of the aforementioned aspects and embodiments and/or for providing the functionality as required by one or more of the aforementioned aspects and embodiments.

According to an eighth aspect of the herein disclosed subject-matter, a method of operating a communication network is provided, the method comprising: operating a base station according to the method of the sixth aspect or an embodiment thereof; and operating a user equipment according to the method of the seventh aspect or an embodiment thereof.

According to further embodiments of the eighth aspect, the method is adapted for providing the functionality of one or more the aforementioned aspects and embodiments and/or for providing the functionality as required by one or more of the aforementioned aspects and embodiments.

According to a ninth aspect of the herein disclosed subject-matter, a computer program is provided, the computer program being adapted for, when being executed by a data processor device, controlling the method as set forth in the fifth aspect or an embodiment thereof.

According to a tenth aspect of the herein disclosed subject-matter, a computer program is provided, the computer program being adapted for, when being executed by a data processor device, controlling the method as set forth in the sixth aspect or an embodiment thereof.

According to a eleventh aspect of the herein disclosed subject-matter, a computer program is provided, the computer program being adapted for, when being executed by a data processor device, controlling the method as set forth in the seventh aspect or an embodiment thereof.

According to a twelfth aspect of the herein disclosed subject-matter, a computer program is provided, the computer program being adapted for, when being executed by a data processor device, controlling the method as set forth in the eighth aspect or an embodiment thereof.

As used herein, reference to a computer program is intended to be equivalent to a reference to a program element and/or a computer readable medium containing instructions for controlling a computer system to effect and/or coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

In the above there have been described and in the following there will be described exemplary embodiments of the subject matter disclosed herein with reference to a control entity, a base station, a user equipment, a communication network, respective methods and respective computer programs. It has to be pointed out that of course any combination of features relating to different aspects of the herein disclosed subject matter is also possible. In particular, some features have been or will be described with reference to apparatus type embodiments whereas other features have been or will be described with reference to method type embodiments. However, a person skilled in the art will gather from the above and the following description that, unless other notified, in addition to any combination of features belonging to one aspect also any combination between features relating to different aspects or embodiments, for example even between features of the apparatus type embodiments and features of the method type embodiments is considered to be disclosed with this application.

The aspects and embodiments defined above and further aspects and embodiments of the present invention are apparent from the examples to be described hereinafter and are explained with reference to the drawings, but to which the invention is not limited.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

The illustration in the drawing is schematically. It is noted that in different figures, similar or identical elements are provided with the same reference signs or with reference signs, which differ from the corresponding reference signs only by an appended character.

Figure 1:
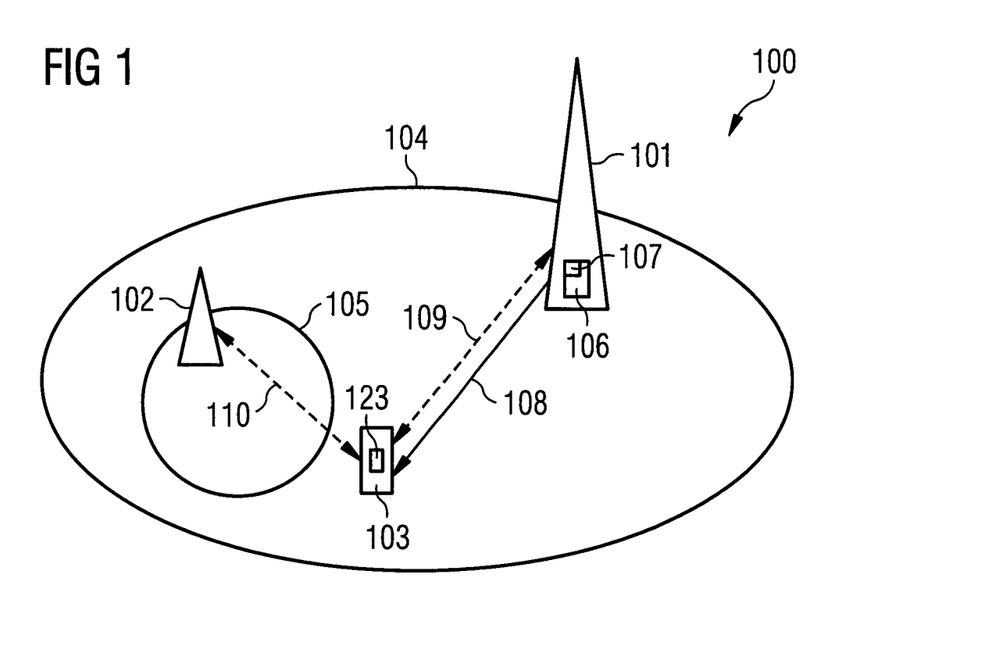
FIG. 1 shows a communication network in accordance with embodiments of the herein disclosed subject-matter.

FIG. 1 shows a communication network 100 in accordance with embodiments of the herein disclosed subject-matter.

The communication network 100 comprises a plurality of base stations and user equipments, of which a first base station 101, a second base station 102 and one user equipment 103 are shown. According to an exemplary embodiment, the communication network 100 is a cellular communication network. For example, in an embodiment the first base station 101 is configured for providing a macro cell, indicated at 104, and the second base station 102 is configured for providing a pico cell 105. The user equipment 103 has Radio resource control (RRC) connections with the two base stations 101, 102, which are indicated at 109 and 110 in FIG. 1. According to an embodiment, the pico cell 105 is configured to be cross-carrier scheduled from the macro cell 104 although both cells operate on the same carrier. Hence, the downlink control signal for the pico cell 105 is configured to be provided via the macro cell 104.

In a time slot the macro cell 104 is on and the pico cell 105 is on. However, due to the limited coverage area of the pico cell 105 in such a case, the pico cell 105 cannot perform a data transmission to the user equipment 103.

According to an embodiment, the first base station 101 comprises a control entity 106, the control entity 106 being in accordance with embodiments of the herein disclosed subject-matter.

The control entity comprises a controller 107 for generating a downlink control signal 108 scheduling a downlink data resource in a first time slot (not shown in FIG. 1). According to an embodiment, the control entity 106 includes a data processor device being adapted for carrying out a computer program, the computer program providing the functionality of embodiments of the herein disclosed subject-matter, in particular for providing the functionality of the controller 107. Hence, in an embodiment, the controller 107 is implemented by software. In other embodiments, the control entity 106 and in particular the controller 107 is provided in hardware or, in another embodiment, in a hybrid implementation including hardware and software components.

According to an embodiment, the controller 107 is configured for providing the downlink control signal 108 over a downlink control resource in an earlier time slot which is chronologically earlier than the first time slot. In accordance with an embodiment, the downlink control signal 108 schedules two or more downlink data resources in respective time slots. In another embodiment, a downlink control signal is provided for each downlink data resource. However, two or more downlink control signals, or, in another embodiment, a single downlink control signal, may be provided in the earlier time slot.

According to an embodiment shown in FIG. 1, the downlink control resource is provided by the first base station 101 and the downlink data resource is provided by the second base station 102. Further, in an embodiment the downlink control resource is located on a first carrier, i.e. in first frequency range, and the downlink data resource is located on the same first carrier. Hence, in such an embodiment the base stations 101 and 102 use the same carrier for providing the downlink control resource and the downlink data resource, respectively. In order to avoid interference, the first base station 101 may stop operating in some time slots, while the second base station 102 operates in all time slots. However, this means that in accordance with embodiments shown in FIG. 1 the downlink control resource and the downlink data resource cannot be provided at the same time from the second base station 102 point of view. However, with the concepts of embodiments of the herein disclosed subject-matter this problem is resolved by providing the downlink control signal 108 in the earlier time slot which is chronologically earlier than the first time slot, wherein in the specific embodiment the first base station 101 uses the first carrier in the earlier time slot and the second base station 102 uses the first carrier in the first time slot.

Hence, according to a terminology used in embodiments of the herein disclosed subject matter, FIG. 1 shows the communication network 100 in the earlier time slot in which the first base station uses the first carrier to transmit the downlink control signal 108 to the user equipment 103.

Figure 2:
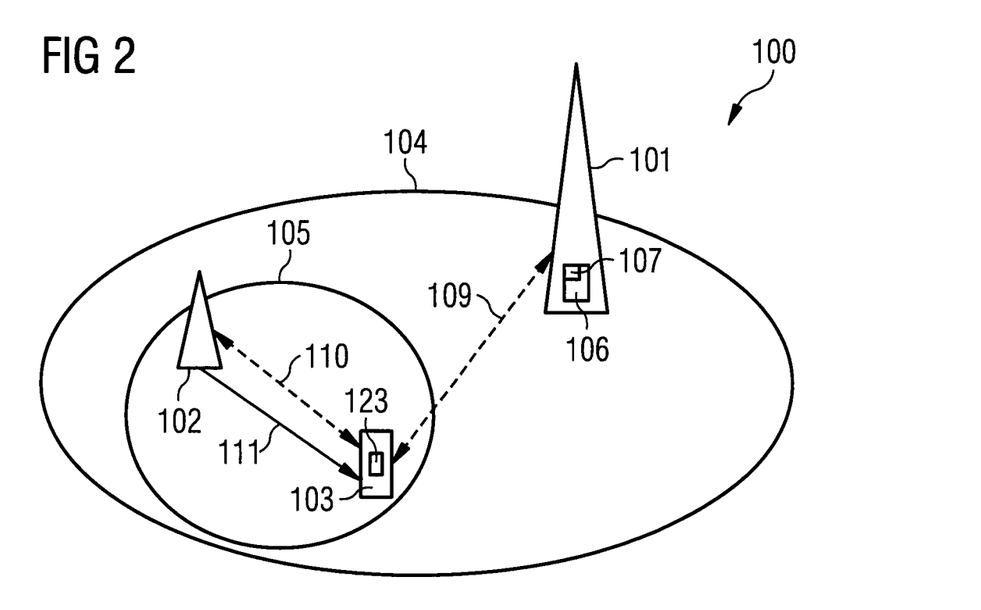
FIG. 2 shows the communication network of FIG. 1 in a different time slot.

FIG. 2 shows the communication network 100 of FIG. 1 in a different, the first time slot in which the second base station 102 uses the first carrier for providing a downlink data resource 111 which can be used to transmit data from the second base station 102 to the user equipment 103.

Since in FIG. 2 the first base station 101 does not operate on the first carrier, the respective macro cell 104 is not provided by the first base station 101 in the first time slot (although shown in FIG. 2 for illustrative purposes). Due to a reduced interference, this causes the pico cell 105 to have a larger coverage as shown in FIG. 2. Hence, while in FIG. 1 the user equipment 103 is outside the pico cell 105, with the shut-off macro cell 104 in the first time slot shown in FIG. 2, the pico cell 105 has a coverage that covers the user equipment 103.

In accordance with an embodiment, the user equipment 103 comprises a controller 123 configured for receiving downlink data over the downlink data resource 111 in a first time slot, wherein the first time slot is indicated by a downlink control signal 108 received over a downlink control resource in an earlier time slot which is chronologically earlier than the first time slot. It should be understood that the configuration of the controller 123 of the user equipment depends in particular on the configuration of the downlink control resource, the downlink data resource, the downlink control signal 108 and the downlink data. Further it should be understood that the controller 123 of the user equipment 103 may be configured so as to be capable of handling different configurations which are in accordance with different embodiments of the herein disclosed subject matter. Likewise also the control entity 106 may be configured so as to be capable of handling different configurations which are in accordance with different embodiments of the herein disclosed subject matter.

Hence, in accordance with embodiments of the herein disclosed subject-matter the downlink data transmission from the pico cell 105 can be scheduled in the first time slot although in the first timeslot the macro cell 104, which is configured to provide downlink control signal for the pico cell 105, is off. Hence, the pico cell is configured to be cross-carrier scheduled from the macro cell although both cells operate on the same carrier. It should be mentioned, since the switching between "macro cell on" and "macro cell off" is on the order of several subframes, it is not possible to reconfigure the cross-carrier scheduling property through radio resource control (RRC) signaling.

Finally, it should be mentioned that the above-described scenario in FIGS. 1 and 2 in another embodiment also allows enhanced inter-cell interference coordination in time division multiplexing with coordinated multi-point transmission/reception (COMP). Also in such an embodiment, the scheduling is done by the primary cell as in the embodiments shown in FIGS. 1 and 2, where the macro cell 104 is the primary cell provided by the base station 101.

Figure 3:
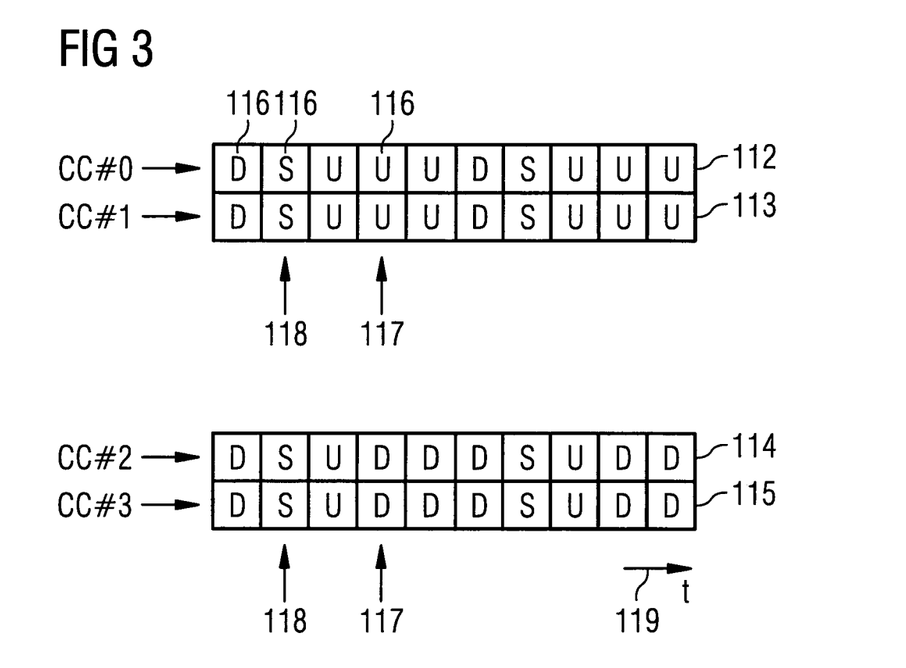
FIG. 3 shows an example of such a carrier-specific TDD configuration in accordance with embodiments of the herein disclosed subject matter.

A further use case of embodiments of the herein disclosed subject-matter is a carrier-specific time division duplex (TDD) configuration that is used for example in carrier aggregation schemes. One potential of TDD carrier aggregation deployment is that carriers with different TDD configurations are provided. For example, an operator could use an uplink heavy configuration on low frequency carriers to improve the uplink control coverage and use downlink heavy configuration on high frequency carriers to boost the downlink capacity for a hotspot area. FIG. 3 shows an example of such a carrier-specific TDD configuration in accordance with embodiments of the herein disclosed subject matter. FIG. 3 shows four component carriers 112, 113, 114, 115. The first component carrier (CC#0) and the second component carrier (CC#1) are uplink heavy component carriers having six uplink subframes indicated by an "U". Further in FIG. 3, the downlink subframes are indicated with "D". "S" denotes a special subframe which provides a downlink resource and are treated as downlink subframes for the description of embodiments of the herein disclosed subject-matter. It is noted that each subframe, a few of which are indicated at 116 in FIG. 3, correspond to the general term "time slot" used herein. Hence, for each component carrier 112, 113, 114, 115 ten subframes or time slots 116 are shown.

For example, if we consider a downlink data resource in a first time slot, indicated at 117 in FIG. 3, the third component carrier 114 provides a downlink resource, whereas the second component carrier 113 provides an uplink resource in the first time slot 117. Further, it is assumed that the second component carrier 113 is a primary component carrier whereas the third component carrier 114 is a secondary component carrier and it is configured to be cross-carrier scheduled by the primary component carrier 113. However, since the first time slot 117 does not provide a downlink resource on the primary component carrier, no downlink assignment can be transmitted on primary component carrier 113 in the first time slot 117. However, in accordance with embodiments of the herein disclosed subject-matter, with a downlink assignment in an earlier time slot 118, the downlink data resource in the first time slot 117 on the third component carrier 114 can be scheduled in the earlier time slot 118, in which the primary component carrier 113 provides a downlink control resource.

Having regard to the time axis t, which is indicated at 119 in FIG. 3, it can be seen that the earlier time slot 118 is chronologically earlier than the first time slot 117, in accordance with embodiments of the herein disclosed subject matter.

Figure 4:
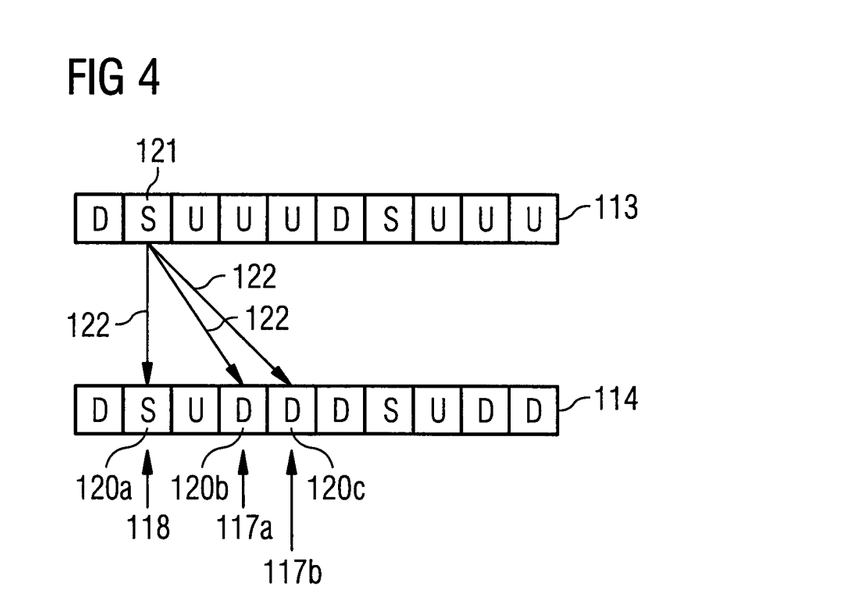
FIG. 4 illustrates scheduling of multiple downlink data resources in a time slot in accordance with embodiments of the herein disclosed subject-matter.

FIG. 4 illustrates scheduling of multiple downlink data resources in a time slot in accordance with embodiments of the herein disclosed subject-matter.

In particular, FIG. 4 shows the primary component carrier 113 of FIG. 3 as well as the secondary component carrier 114 of FIG. 3. In accordance with embodiments of the herein disclosed subject-matter, FIG. 4 shows the scheduling of three downlink data resources 120a, 120b, 120c from control signaling in a single downlink control resource 121. In particular, a downlink control signal (not shown in FIG. 4) provided over the downlink control resource 121 in the earlier time slot 118 schedules the downlink data resources 120a, 120b, 120c in the earlier time slot and in two first time slots indicated at 117a, 117b in FIG. 4. Hence, as is apparent from FIG. 4, the herein disclosed subject-matter does not exclude scheduling according to known scheduling schemes, e.g. as known from 3rd Generation Partnership Project (3GPP) release 9. For example, embodiments of the herein disclosed subject matter do not exclude scheduling of a downlink data resource in the earlier time slot by a downlink control signal over a downlink control resource in the earlier time slot, as shown in FIG. 4. The functional relationship of the downlink control resource 121 and the downlink data resources 120a, 120b, 120c is indicated at 122. It should be understood that the arrows 122 do not relate to a transmission between the carriers 113, 114 but only indicate the aforementioned relationship.

According to an embodiment, if no downlink control resource is available in the first time slot 117a, 117b in which a downlink data resource 120b, 120c is provided, the downlink data resource is scheduled in the latest time slot (which thereby forms an earlier time slot) which is located temporally earlier than the first time slot 117a, 117b and which provides a downlink control resource. This is shown in FIG. 4. In particular, in the first time slots 117a, 117b there is no downlink control resource available in the primary component carrier 113. However, scheduling is performed in the earlier time slot 118, which is the latest time slot before the first time slots 117a, 117b in which a downlink control resource 121 is available.

It should be noted that the above mentioned determination of the earlier time slot is only exemplary and that other method or rules may be used, or some boundary conditions may be taken into account for determination of the earlier time slot.

In many use cases a maximum number of first time slots being scheduled from a single earlier time slot is four. Further, according to an embodiment, the downlink control signal, which schedules the downlink data resource, comprises a downlink index indicating the first time slot in which the downlink data resource is to be scheduled. With the number of four time slots (e.g. subframes) that are scheduled by a single control signal, a 2-bit downlink index is sufficient. However, in other use cases a higher number of first time slots being scheduled from a single earlier time slot is possible with an embodiment. It should be understood that the length of the downlink index may be chosen according to the requirements of the use case considered. Hence, the case with more than four scheduled first time slots and/or a downlink index larger than 2 bits is also contemplated. On the other hand, the case with less than four scheduled first time slots and/or a downlink index smaller than 2 bits is also contemplated.

According to an embodiment, a single downlink assignment is used to schedule one or more downlink subframes in which downlink data resources are provided. If a full scheduling granularity is desirable, up to four bits may be required to indicate the downlink index, assuming a maximum number of first time slots being scheduled from a single earlier time slot is four. In order to have a fixed number of bits, e.g. two bits, for all possible use cases, according to an embodiment a reduced scheduling granularity is allowed.

In an example given below, four subframes are to be handled, referred to as x1, x2, x3 and x4. Hence in example given, the following mapping between the downlink index state (referred to as "state" in the following) and the subframes to be scheduled can be used:
state "00": scheduling subframe x1
state "01": scheduling subframes x1 and x2,
state "10": scheduling subframes x2, x3 and x4,
state "11": scheduling all four subframes.

It should be mentioned that the above example is only exemplary and is not intended to limit the concept of providing a downlink index and its respective mapping on the subframes or downlink data resources to be scheduled.

According to an embodiment, the mapping table as provided above may be configured by a higher layer. Hence, in an embodiment, the mapping table which maps the downlink index state to the downlink data resources to be scheduled may be adaptable adapted during operation of the control entity. According to other embodiments, the mapping table might be hard-coded.

According to a further embodiment, one downlink subframe assignment schedules only a single downlink subframe. In other words, one downlink control signal schedules only a single downlink data resource. This in turn means that there will be multiple downlink assignments or downlink control signals if more than one downlink subframe is to be scheduled. Compared to the embodiment described above, where one downlink assignment schedules one or multiple downlink subframes, such an implementation needs enough states of the downlink index to indicate which single downlink subframe is scheduled. Then more downlink grants can be transmitted in one time slot if more downlink subframes are to be scheduled.

While some embodiments employ time division duplexing (TDD) and other embodiments employ frequency division duplexing (FDD), it should be understood that generally the herein disclosed subject matter is not limited to one of these schemes (TDD or FDD) unless required by an embodiment.

Having regard to the subject matter disclosed herein, it should be mentioned that generally the term "subframe" is only used as an exemplary example for the term "time slot" and is considered to also disclose a respective embodiment where "subframe" is replaced by "time slot".

Further, although some embodiments refer to a "base station", which might be an "e-NodeB" in case of 3GPP LTE, it should be understood that each of these references is considered to implicitly disclose a respective reference to the general term "network access node". Also other terms which relate to specific standards or specific communication techniques are considered to implicitly disclose the respective general term with the desired functionality.

It should further be noted that a base station, a user equipment or a control entity as disclosed herein are not limited to dedicated entities as described in some embodiments. Rather, the herein disclosed subject matter may be implemented in various ways in various locations in the communication network while still providing the desired functionality.

It should further be noted that any entity disclosed herein (e.g. components, units and devices, such as controllers or entities) are not limited to a dedicated entity as described in some embodiments. Rather, the herein disclosed subject matter may be implemented in various ways and with various granularities on device level or software module level while still providing the desired functionality. For example, control units of a controller, and, optionally, also two or more control entities may be implemented by a single controller, just to name one example of alternative configurations. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein. According to an embodiment, a controller comprises a processor device including at least one processor for carrying out at least one computer program corresponding to a respective software module. Generally, the functionality of two or more controllers or control entities described herein may be provided by a single controller. For example, two or more controllers or control entities may be provided by respective computer programs executed by a single processor device.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

There is provided a control entity for a communication network, a base station including such a control entity and a user equipment for communication with such a base station. The control entity comprises a controller for providing a downlink control signal (e.g. a downlink assignment) scheduling a downlink data resource in a first time slot wherein the controller is configured for providing the downlink control signal over a downlink control resource in an earlier time slot which is chronologically earlier than the first time slot.

LIST OF REFERENCE SIGNS 100 communication network
101 first base station
102 second base station
103 user equipment
104 macro cell
105 pico cell
106 control entity
107 controller
108 downlink control signal
109 RRC connection
110 RRC connection
111 downlink data resource
112 first component carrier cc#0
113 second component carrier (primary carrier) cc#1
114 third component carrier (secondary carrier) cc#2
115 fourth component carrier cc#3
116 time slot (e.g. subframe)
117, 117a, 117b first time slot
118 earlier time slot
119 time axis
120a, 120b, 120c downlink data resources
121 downlink control resource
122 functional relationship between downlink control resource and downlink data resource(s)
123 controller of 103

What is claimed is:

1. An apparatus in a communications network comprising: at least one processor; and at least one memory including computer program code, wherein the at least one processor, in response to execution of the computer program code, is configured to cause the apparatus to perform at least the following:
generating a downlink control signal scheduling a downlink data resource in a first time slot;
providing the downlink control signal over a downlink control resource in an earlier time slot wherein the earlier time slot is chronologically earlier than the first time slot and wherein the downlink control signal comprises a downlink index indicating the time slot in which the downlink data resource is to be scheduled;
mapping a respective state of the downlink index to the first time slot, wherein the mapping is semi-statically configured; and
transmitting the downlink control signal to a user equipment in the communications network.

2. The apparatus of claim 1, wherein the downlink control resource is provided by a first base station and the downlink data resource is provided by a second base station, different from the first base station.

3. The apparatus of claim 1, wherein the downlink control resource is provided by a first base station and the downlink data resource is provided by the same, first base station.

4. The apparatus of claim 1, wherein the downlink control resource is located on a first carrier and the downlink data resource is located on the same, first carrier.

5. The apparatus of claim 1, wherein the downlink control resource is located on a first carrier and the downlink data resource is located on a second carrier, the second carrier being different from the first carrier.

6. The apparatus of claim 1 comprised within a base station in a communications network.

7. The Apparatus of claim 6 further comprised within a communications network.

8. An apparatus in a communications network comprising at least one processor; and at least one memory including computer program code, wherein the at least one processor, in response to execution of the computer program code, is configured to cause the apparatus to perform at least the following:
receiving downlink data over a downlink data resource in a first time slot;
receiving a downlink control signal over a downlink control resource indicating the first time slot in an earlier time slot,
wherein the earlier time slot is chronologically earlier than the first time slot,
wherein the downlink control signal comprises a downlink index indicating the time slot in which the downlink data resource is to be scheduled,
wherein the first time slot was mapped in a semi-statically configured manner from a respective state of the downlink index.

9. The apparatus of claim 8 comprised within at least one user equipment in a communications network.

10. A method comprising:
generating a downlink control signal in a communications network indicating a first time slot for a downlink data resource;
providing the downlink control signal over a downlink control resource in an earlier time slot which is chronologically earlier than the first time slot and wherein the downlink control signal comprises a downlink index indicating the time slot in which the downlink data resource is to be scheduled;
mapping a respective state of the downlink index to the first time slot, wherein the mapping is semi-statically configured; and
transmitting the downlink control signal to a user equipment in the communications network.

11. The method of claim 10 comprised in the operation of a control entity of a base station.

12. The method of claim 11 comprised within a base station in a communication network.

13. The method of claim 10, wherein the downlink control resource is located on a first carrier and the downlink data resource is located on the same, first carrier.

14. The method of claim 10, wherein the downlink control resource is located on a first carrier and the downlink data resource is located on a second carrier, the second carrier being different from the first carrier.

15. A computer program product embodied on a non-transitory computer-readable medium in which a computer program is stored that, when being executed by a computer, is configured to provide instructions to control or carry out: the method of claim 10.

16. A method comprising:
receiving by a device in a communications network downlink data in a downlink data resource in a first time slot;
receiving a downlink control signal over a downlink control resource indicating the first time slot in an earlier time slot,
   wherein the earlier time slot is chronologically earlier than the first time slot,
   wherein the downlink control signal comprises a downlink index indicating the time slot in which the downlink data resource is to be scheduled,
   wherein the first time slot was mapped in a semi-statically configured manner from a respective state of the downlink index.

17. The method of claim 16 comprised within a user equipment in a communications network.

18. A computer program product embodied on a non-transitory computer-readable medium in which a computer program is stored that, when being executed by a computer, is configured to provide instructions to control or carry out: the method of claim 16.

* * * * *